United States Patent Office 3,054,780
Patented Sept. 18, 1962

3,054,780
RESINOUS REACTION PRODUCTS OF ALKYLENE GLYCOL ESTERS OF ACRYLIC OR METHACRYLIC ACID AND A SULFUR CHLORIDE
John L. Lang, Midland, Mich., assignor to The Dow Chemical Company, Midland, Mich., a corporation of Delaware
No Drawing. Filed Oct. 13, 1959, Ser. No. 846,063
6 Claims. (Cl. 260—79)

This invention relates to new copolymers and to processes for preparing the same. More particularly it relates to such products prepared from acrylate esters of organic acids together with sulfur halides.

This application is a continuation-in-part of U.S. Serial No. 614,055, filed October 5, 1956.

It is the principal object of this invention to provide a new class of copolymers composed of certain acrylate esters together with sulfur halides.

It is a further object to provide a process for preparing such copolymers.

Other objects will become apparent as the description proceeds.

It has now been found that new and useful copolymers may be prepared by subjecting a monomeric material consisting of an alkylene glycol diester of an acid selected from acrylic and methacrylic acids with a sulfur halide in proportions as will be later described.

The alkylene glycol diesters useful in this invention are those having at least two of the alkylene glycol hydroxyl groups esterified with either acrylic or methacrylic acids. When more than two of the hydroxyls are esterified the copolymeric products are insoluble, infusible, cross-linked materials having little utility. When only one hydroxyl is esterified no copolymeric products are obtained. A typical example of a useful diester is ethylene glycol dimethacrylate.

The useful sulfur halides are those which are capable of reaction with an olefinically unsaturated compound. Typical examples of such halides are sulfur monochloride ($S_2Cl_2$) and sulfur dichloride ($SCl_2$). Usually the compounds as available commercially will contain small but significant amounts of one of the other halides and these mixtures are equally operable to secure the advantages of the invention. The oxygen compounds such as sulfuryl chloride and thionyl chloride do not provide the polymers contemplated in the instant invention.

The polymerizations may be carried out by bulk or solution polymerization procedures, the techniques of which are well known. When solution polymerization methods are employed, any inert solvent, such as toluene, may be used. The choice of solvent will be determined by economic and hazardous considerations, volatility, and other known or easily obtainable properties.

The process is carried out by adding the sulfur halide to the ester alone or in solution, preferably with agitation. When both polymerizable components are added initially, the reaction is difficult to control and the properties of the products are not reproducible.

These reactions are exothermic and have no appreciable induction period as is noticed in many polymerization reactions. It is preferred to conduct the reaction at a temperature less than about 40° C. Although polymeric products may be obtained by using higher temperatures, the low temperatures favor better control of the reaction.

The molar ratio of monomeric reactants within which useful polymeric products are obtained is substantially stoichiometric. When substantially less than one mole of sulfur halide per mole of ester is used, polymeric products are sometimes obtainable but usually of low molecular weight or in poor yields and with properties principally of the ester homopolymer when such is possible. When more than two moles of sulfur halide per mole of ester is used, the sulfur halide in excess is wasted.

The copolymer products of this invention may be prepared in a wide variety of properties and capable of diversified utility. The products range from moldable materials to cross-linked infusible materials. Products may also be prepared ranging from readily soluble to insoluble in common organic solvents. The products are capable of being molded into articles, extruded into fibers and filaments, and cast from solution into films and foils.

The following example is offered by way of illustrating the products of the invention and the process for preparing the same. In the example all parts and percentages are by weight.

Into a vessel containing a solution of 3.96 parts of methacrylic acid:ethylene glycol diester and 4 parts of toluene there was added portionwise and with stirring and cooling 2.24 parts of a mixture of sulfur chlorides having a specific gravity of 1.640 at 15° C. and composed of about 71 percent of sulfur dichloride and 29 percent of sulfur monochloride. Upon completion of the reaction the product was a syrupy polymer containing solution which was precipitated by pouring into alcohol. Films and fibers were prepared from the polymer solutions by known methods.

Similar products are obtained when the sulfur chloride mixture is replaced with either sulfur monochloride or sulfur dichloride and when the diester is of propylene glycol and acrylic acid or of other alkylene glycol containing up to about 4 carbon atoms and either acrylic or methacrylic acid.

It was found that because of the exothermic nature of the reaction the sulfur halide had to be added extremely slow in all of the examples if light colored products were to be obtained. When the addition was carried out under conditions so that an excessive temperature occurred the products were usually dark colored. The products formed from the reaction will expand to a black rigid foam if heated. Such foams will also occur if the addition of the sulfur halide is so rapid that the reaction temperature rises in which case polymerization and foaming will occur simultaneously.

What is claimed is:
1. As a new copolymeric material the polymerization product of one molar equivalent of an alkylene glycol diester of an acid selected from acrylic and methacrylic acids with from one to two molar equivalents of a sulfur halide selected from the group consisting of sulfur monochloride, sulfur dichloride, and mixtures thereof.

2. As a new copolymeric material the polymerization product of one molar equivalent of an alkylene glycol diester of an acid selected from acrylic and methacrylic acids with from one to two molar equivalents of a sulfur monochloride capable of reacting with an olefinically unsaturated compound.

3. As a new copolymeric material the polymerization product of one molar equivalent of an alkylene glycol diester of an acid selected from acrylic and methacrylic acids with from one to two molar equivalents of a sulfur dichloride capable of reacting with an olefinically unsaturated compound.

4. As a new copolymeric material the polymerization product of one molar equivalent of an alkylene glycol diester of an acid selected from acrylic and methacrylic acids with from one to two molar equivalents of a mixture of sulfur monochloride and sulfur dichloride capable of reacting with an olefinically unsaturated compound.

5. As a new copolymeric material the polymerization product of one molar equivalent of ethylene glycol dimethacrylate with from one to two molar equivalents of sulfur monochloride.

6. The process for preparing copolymeric products comprising the slow addition of from one to two molar equivalents of a sulfur halide selected from the group consisting of sulfur monochloride, sulfur dichloride, and mixtures thereof to one molar equivalent of an alkylene glycol diester of an acid selected from acrylic and methacrylic acids at a temperature of less than about 40° C. and allowing the reaction to proceed to completion.

References Cited in the file of this patent

UNITED STATES PATENTS

| | | |
|---|---|---|
| 1,535,740 | Snelling | Apr. 28, 1925 |
| 1,897,133 | Luther | Feb. 14, 1933 |